United States Patent
Hofer et al.

(10) Patent No.: US 10,618,737 B2
(45) Date of Patent: Apr. 14, 2020

(54) CONVEYING DEVICE WITH IMPROVED WIRING OF DRIVE MOTOR AND BRAKE OF A CONVEYING ROLLER AND OPERATING METHOD THEREFOR

(71) Applicant: TGW Mechanics GmbH, Wels (AT)

(72) Inventors: Stefan Hofer, Pollham (AT); Franz Weissenboeck, Steinerkirchen an der Traun (AT); Christoph Wolkerstorfer, Wels (AT)

(73) Assignee: TGW Mechanics GmbH, Wels (AT)

( * ) Notice: Subject to any disclaimer, the term of this patent is extended or adjusted under 35 U.S.C. 154(b) by 59 days.

(21) Appl. No.: 15/557,172

(22) PCT Filed: Mar. 3, 2016

(86) PCT No.: PCT/AT2016/050049
§ 371 (c)(1),
(2) Date: Dec. 20, 2017

(87) PCT Pub. No.: WO2016/141396
PCT Pub. Date: Sep. 15, 2016

(65) Prior Publication Data
US 2018/0141756 A1    May 24, 2018

(30) Foreign Application Priority Data

Mar. 12, 2015 (AT) .............................. A 50200/2015

(51) Int. Cl.
*B65G 13/06* (2006.01)
*B65G 23/08* (2006.01)
(Continued)

(52) U.S. Cl.
CPC ............ *B65G 13/06* (2013.01); *B65G 23/08* (2013.01); *H02K 7/1025* (2013.01); *H02K 21/22* (2013.01)

(58) Field of Classification Search
CPC ........ B65G 13/06; B65G 23/08; B65G 23/26; H02K 7/1025; H02K 21/22; H02K 7/10
See application file for complete search history.

(56) References Cited

U.S. PATENT DOCUMENTS 3,713,521 A * 1/1973 Moritake ............. B65G 13/075
193/37
5,442,248 A * 8/1995 Agnoff ................... B65G 23/08
310/67 R
(Continued)

FOREIGN PATENT DOCUMENTS

CN    1823461 A    8/2006
CN  102026894 A    4/2011
(Continued)

OTHER PUBLICATIONS

International Search Report of PCT/AT2016/050049, dated Jun. 23, 2016.

*Primary Examiner* — Mark A Deuble
(74) *Attorney, Agent, or Firm* — Collard & Roe, P.C.

(57) ABSTRACT

A conveying device (1) is specified, having two frame profiles (2, 3) and a conveying roller (4), arranged in between, with a drive motor (5) and a brake (6). The drive motor (5), located closer to the first frame profile (2), is connected in this case to a power supply bus (10) positioned on the first frame profile (2), and the brake (6), located closer to the second frame profile (3), is connected to a power supply bus (12) positioned on the second frame profile (3). In an operating method for the conveying roller (4), the drive motor (5)/the brake (6) are operated with a first voltage (U1) and associated electronic controllers (17, 30) are operated with a second, lower voltage (U2). In addition, the brake (6) is completely released/ventilated only with a time delay after (Continued)

Figure 1:
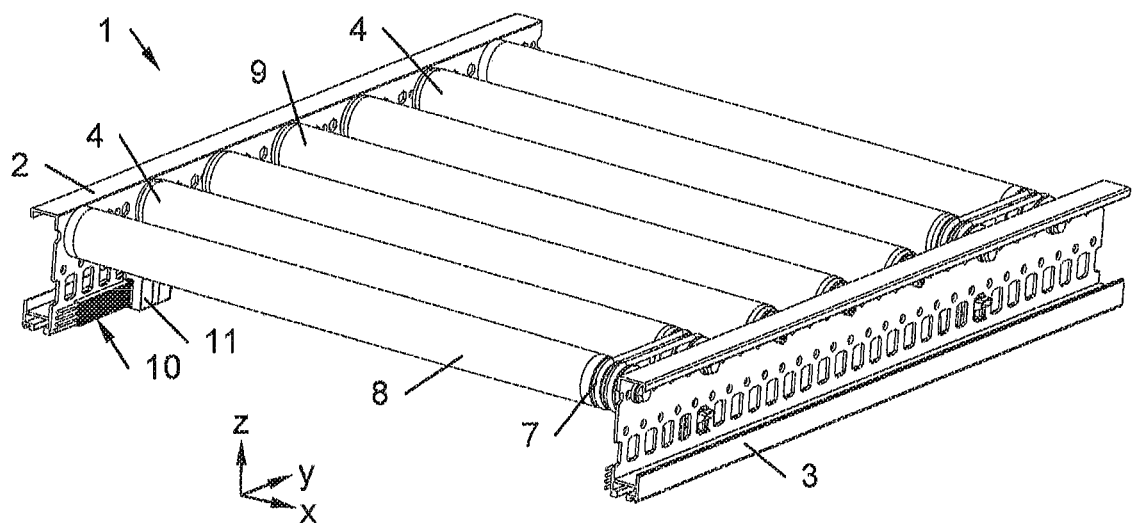

the application of an electric voltage to the drive motor (5) for the purpose of starting up the conveying roller (4).

26 Claims, 11 Drawing Sheets

(51) Int. Cl.
*H02K 21/22* (2006.01)
*H02K 7/102* (2006.01)

(56) References Cited

U.S. PATENT DOCUMENTS

| | | | |
|---|---|---|---|
| 6,456,032 B2 * | 9/2002 | Itoh | B65G 13/075 |
| | | | 318/362 |
| 6,837,364 B2 * | 1/2005 | Kanaris | B65G 23/08 |
| | | | 198/782 |
| 7,021,456 B2 | 4/2006 | Haan et al. | |
| 2004/0195078 A1 | 10/2004 | Anderson et al. | |
| 2005/0109584 A1 | 5/2005 | Hayashi et al. | |
| 2007/0114861 A1 | 5/2007 | Bott et al. | |
| 2009/0166157 A1 * | 7/2009 | Kratz | B65G 23/08 |
| | | | 198/788 |
| 2010/0294625 A1 * | 11/2010 | Wolkerstorfer | B65G 23/08 |
| | | | 198/575 |
| 2011/0062000 A1 | 3/2011 | Yamamoto | |
| 2011/0155539 A1 | 6/2011 | Schmidt et al. | |
| 2014/0175938 A1 | 6/2014 | Mignano | |

FOREIGN PATENT DOCUMENTS

| | | |
|---|---|---|
| CN | 102137800 A | 7/2011 |
| CN | 102712417 A | 10/2012 |
| CN | 103883614 A | 6/2014 |
| EP | 1 107 443 A1 | 6/2001 |
| EP | 1 172 312 B1 | 1/2002 |
| EP | 1 848 094 A2 | 10/2007 |
| JP | 2003-051362 A | 2/2003 |
| JP | 2011-088733 A | 5/2011 |
| WO | 2011/029120 A1 | 3/2011 |

* cited by examiner

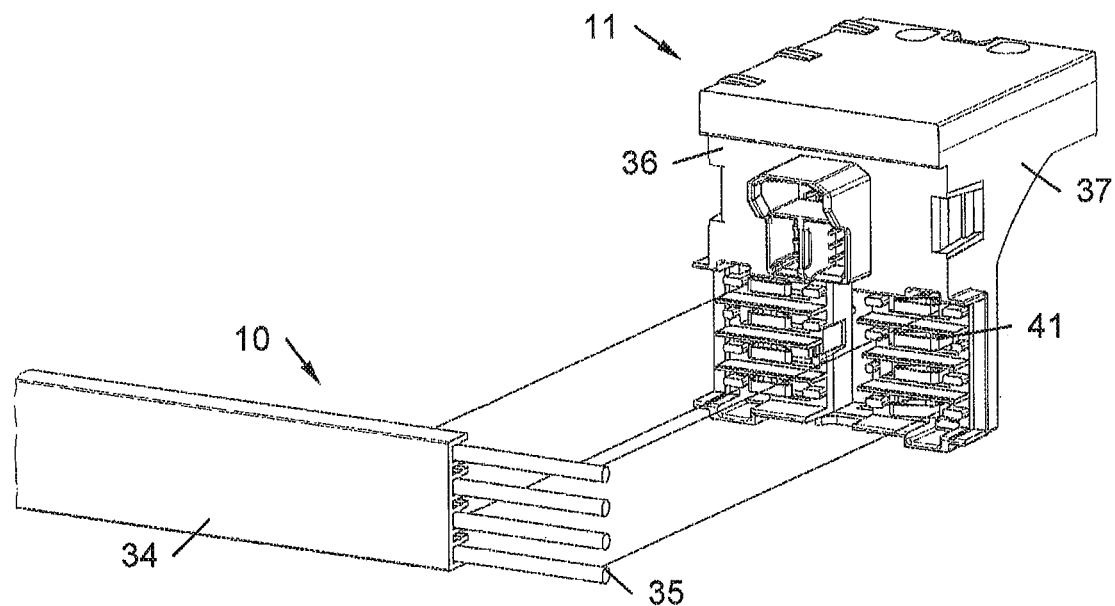
Fig. 12
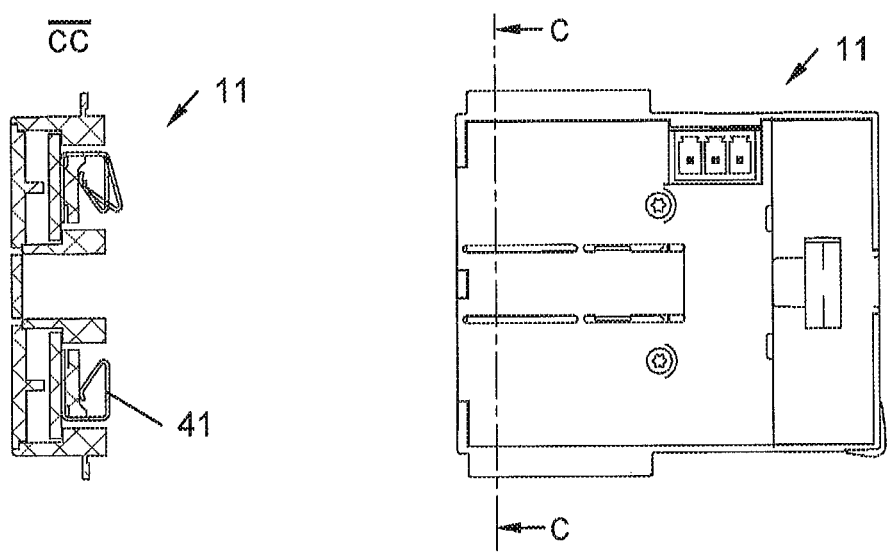
Fig. 13  Fig. 14

CONVEYING DEVICE WITH IMPROVED WIRING OF DRIVE MOTOR AND BRAKE OF A CONVEYING ROLLER AND OPERATING METHOD THEREFOR

CROSS REFERENCE TO RELATED APPLICATIONS

This application is the National Stage of PCT/AT2016/050049 filed on Mar. 3, 2016, which claims priority under 35 U.S.C. § 119 of Austrian Application No. A 50200/2015 filed on Mar. 12, 2015, the disclosure of which is incorporated by reference. The international application under PCT article 21(2) was not published in English.

The invention relates to conveying device, comprising a first frame profile and a second frame profile spaced apart from the latter and at least one conveying roller arranged between the frame profiles comprising a drive motor and a brake. The drive motor is thereby closer to the first frame profile than the second frame profile. In addition, the conveying device comprises a first power supply bus arranged along the first frame profile, which is connected or coupled electrically to the drive motor. Lastly, the conveying device also comprises a brake integrated into the conveying roller. Furthermore, the invention relates to an operating method for a conveying roller with a drive motor and a brake.

A conveying device of this kind is known in principle. For example EP 1 848 094 A2 and U.S. Pat. No. 7,021,456 B2 disclose conveying devices with conveying rollers having an integrated brake. A disadvantage of the prior art is in particular the comparatively complex cabling of the conveying roller or the conveying device.

An objective of the invention is therefore to provide an improved conveying device. In particular, the cost of the cabling for the conveying roller or the conveying device should be reduced in this way. Furthermore, it is also an objective of the invention to provide an improved operating method for a conveying roller with a drive motor and a brake.

The objective of the invention is achieved by a conveying device of the aforementioned kind, in which
 the brake is arranged closer to the second frame profile than the first frame profile and
 a second power supply bus running along the second frame profile is provided which is connected or coupled electrically to the brake.

In particular, the drive motor is separated electrically from the brake inside the conveying roller. This means that inside the conveying roller there is no electrical connection between the drive motor and the brake, and in particular in the conveying roller there is no power supply bus between the drive motor and brake. In this connection it is also an advantage if the cabling for the drive motor and if necessary for a first electronic control assigned to the drive motor is guided out of the conveying roller solely on the side of the conveying roller closer to the first frame profile and a cabling for the brake and if necessary for a second electronic control assigned to the brake is guided out of the conveying roller solely on the side of the conveying roller closer to the second frame profile.

By means of the proposed measures a conveying device and in particular a conveying roller can have a particularly simple structure. On the one hand there is no need to thread a connecting cable between the motor and brake through the conveying roller, on the other hand the cabling to the drive motor and the cabling to the brake is independent of the length of the conveying roller. In particular, the drive motor and the brake can be designed as independent assemblies, which are inserted respectively into a pipe forming the roller body. Regardless of the length of the conveying roller and thus independently of the nominal width of the conveying device, similarly designed drive motors and/or similarly designed brakes can be used. In this way also a modular structure of the conveying roller is possible, as in a simple manner conveying rollers can be produced which only have a motor, only have a brake or have a drive motor and brake. A further advantage is that the number of cables can be reduced overall, if (roughly speaking) the distance between the rollers is smaller than their length. This is the case particularly with powerful conveying devices. The cables required for the second power supply bus are here shorter than the cables would be inside the conveying roller.

It is also advantageous if the conveying device comprises a first electronic control assigned to the drive motor and a second electronic control assigned to the brake, wherein the first electronic control is separated electrically from the second electronic control inside the conveying roller. Inside the conveying roller there is thus no electrical connection between the first and the second electronic control. In this way it is possible to reduce the cost of cabling for the conveying roller and facilitate its modular structure.

It is advantageous in the above case if the first electronic control is arranged (directly or indirectly) on the first frame profile and/or the second electronic control is arranged (directly or indirectly) on the second frame profile. In this way the structure of the conveying roller is simplified further. In addition, the conveying device can also be maintained easily due to the controls arranged outside the conveying roller.

However, it is also advantageous in the above case if the first electronic control is arranged on the inside of the conveying roller, wherein the first electronic control is closer to the first frame profile than the second frame profile, and/or the second electronic control is arranged on the inside of the conveying roller, wherein the second electronic control is closer to the second frame profile than the first frame profile. Due to the high degree of integration the assembly of a conveying device can be simplified in this way.

Generally, it is also an advantage if the brake is designed as an electromagnetically activated, self-retaining friction brake. In this way the conveying roller is automatically braked if the supply voltage for the brake fails. In particular, the brake can be used as a parking brake (i.e. for holding already stopped conveying rollers) and/or as an operating brake (i.e. for braking moved conveying rollers). Particularly if the brake is used as a parking brake, form-fitting systems such as for example a toothed brake or claw brake can be provided. It is also possible for the brake to be used mostly as a parking brake and only as an operating brake in exceptional cases. For example, the braking of moved conveying rollers in normal operation can be performed by the drive motor. In exceptional cases, for example if braking by the drive motor is not possible due to the failure of the supply voltage, the brake is used as an operating brake.

It is also an advantage if the braking torque of the brake is greater than the drive torque of the drive motor. In this way the conveying roller itself can then be braked and stopped if the drive motor drives the conveying roller in an undesirable manner as the result of a control defect.

It is also particularly advantageous if the first and the second power supply bus each have at least three conductors which are isolated from one another, wherein a first conductor is connected to a power supply input of the drive motor or the brake, a second conductor is connected to a power supply input of the first electronic control or the second electronic control and at least a third conductor is connected to a ground connection of the said assemblies.

In this way the objective of the invention can be achieved with regard to an additional aspect by means of an operating method for a conveying roller with a drive motor and a brake, in which the drive motor and the brake are operated at a first voltage and a first electronic control assigned to the drive motor and/or a second electronic control assigned to the brake are operated at a second, lower voltage. Due to the higher first voltage the relatively strong drive motors and brakes can be provided with electricity with relatively low conduction losses, whilst the electronic controls are provided with a more suitable low second voltage. In addition, disturbances which are dispersed in particular from the drive motors into the power lines do not have any effect or only have a small effect on the second supply voltage for the electronic controls. The first voltage can have a value of 48V for example and the second voltage can have a value of 24V for example.

It is also particularly advantageous if in a circuit leading to the brake an (electronic) switching element is provided and the second electronic control is designed to open the switch, when a drop in the voltage below a first predefinable threshold has been detected at a power supply input of the brake and/or if a drop of voltage below a predefined or predefinable second threshold has been detected or determined at a power supply input of the second electronic control. Thus it is an advantage for an operating method for the conveying device if a circuit carrying the first voltage, which contains the brake, is switched off, when a drop of the first voltage below a first predefinable threshold has been detected and/or if a drop of the second voltage below a second predefinable/predefined threshold has been detected or determined. If the first or second voltage is no longer sufficient for the secure operation of the brake or the electronic control assigned to the latter, the conveying roller is automatically braked when using a self-supporting brake. The operation of the conveying device it thus particularly reliable. Of course, it is also possible for the brake to be activated when the first or second voltage is no longer sufficient for the safe operation of the drive motor or the electronic control assigned to the latter. The switching element can be designed for example as an electronic switching element (e.g. transistor, in particular FET) or as an electromechanical switching element (e.g. relay).

A further aspect of the objective of the invention can be achieved by a conveying device in which the second electronic control or a superordinate control is designed to fully release or raise the brake on the basis of a command to only start up the conveying roller after a time delay after applying electric voltage to the drive motor. Thus this aspect of the objective can also be achieved by means of an operating method for a conveying roller with a drive motor and a brake, in which by means of a superordinate control, for example a main computer, a command is received for starting up the conveying roller, and in which due to the said command electric voltage is applied to the drive motor and the brake is only fully released or raised after a time delay. In this way it is possible to avoid the unwanted backwards rotation of the conveying roller and associated with this the unwanted backwards movement of a conveyed item or object when starting up the conveying roller. In this way it is noted in particular that the said time delay relates to the full release or raising of the brake, and the release of the brake can also be initiated when applying voltage to the drive motor or even before this. By means of the proposed measures the backwards or forwards movement of a unit good, such as for example a container, can be avoided on ascending or descending sections of the conveying line.

In particular, it is an advantage in the above case, if the torque emitted by the drive motor is increased successively and the braking torque applied by the brake is lowered successively, whereby the two processes can begin essentially at the same time. In this way the conveying roller can be started up particularly gently. A control signal for the drive motor or the brake can thereby be continuous or also pulse-like with a variable duty cycle (pulse width modulation).

It is also particularly advantageous if the rotation of the conveying roller is monitored during the start-up process and a time gradient of a braking torque of the brake is lowered with rotations which are in the same direction as the torque output by the drive motor, and is increased with rotations which are in opposite direction to the torque output by the drive motor and in particular is also reversed. By means of the proposed measures the braking torque can be lowered relatively rapidly to enable the rapid start-up of the conveying roller. If it turns out that the conveying roller rotates backwards due to excessively high load torque in an undesirable manner, the braking torque is increased again in order to stop said rotation or at least curb it. Conversely, the brake can be released even more rapidly, if it turns out that the conveying roller begins to rotate in the desired direction and the motor torque is thus greater than the load torque. By means of the proposed measures the start-up of the unit goods can be performed fairly rapidly regardless of their weight and the resulting load torque.

It is also advantageous if the brake is released/raised by a step-like control signal in one step. In this way the control technology required for releasing/raising the brake is particularly minimal. In a further variant the release/raising of the brake can be made dependent on a torque output by the drive motor. In this case the brake is released/raised in one step in an advantageous embodiment of the conveying device by a step-like control signal, when the torque output by the drive motor has a predefinable value. In this way an undesirable backwards rotation of the conveying roller can be largely avoided.

Furthermore, it is advantageous if the torque emitted by the drive motor is increased by a stepped control signal in one step to the said predefinable value. In this way also the control technology for starting up the drive motor is particularly low.

It is also advantageous if the first power supply bus and/or the second power supply bus has an isolator running along the first frame profile or along the second frame profile with a plurality of mounts open on the longitudinal side and a plurality of conductors arranged in the isolator. In this way it is possible to install the power supply buses in a simple manner. For example, the conductors are simply clipped into the isolator.

It is also advantageous if a conductor is placed in each mount respectively, wherein the form factor f of a conductor, which is defined as a quotient of the circumference of a circle with an equivalent area to the cross-section of the conductor and the circumference of the said cross-section of the conductor, is in the range of f=0.88 to f=1.00. In this way also more complex conveyor belt paths can be easily provided in particular with curved courses, ascending and helical courses, as the conductors have essentially the same bending behavior in all directions. In particular, the resistance moment is the same or almost the same in x-direction and y-direction. Furthermore, the conveying rollers with a drive motor and brake can be used flexibly, as the conductors can be contacted practically over their whole direction. It is also practical in this case to make the isolator from a lightly bendable material. In particular, it is an advantage if the isolator is made of PVC-U and/or from a material with a modulus of elasticity of about 2900 N/mm².

It is advantageous if the cross-section of a conductor is polygonal, in particular a regular polygon. In particular, the cross-section of a conductor can thus be rectangular but also approximately rectangular, quadratic, hexagonal or octagonal.

It is also advantageous if the cross-section of a conductor is oval, in particular circular. In particular, the cross-section of a conductor can be oval but also approximately circular or circular.

If is also advantageous if the electric connection to the drive motor, brake, first electronic control and/or second electronic control is provided by means of resilient contacts bearing flat on the conductors. In this way simply designed contacts for the electric contact of the drive electronics and brake electronics are used. In particular, said contacts can be arranged in a special connection box separate from the conveying roller. A connection box can contain the first electronic control and another connection box can contain the second electronic control. In particular, the connection boxes can be designed to be similar. It is also possible in general that a control is provided which covers both the functions of the first electronic control and the functions of the second electronic control. Identical controls are used as necessary as a first or second electronic control.

It is also advantageous if the electric connection of several sections of conductors is performed by means of resilient contacts surrounding the conductor. In this way the transition resistance can be kept low and comparatively high currents can be conducted via the said contacts. It is particularly advantageous in this case if for each conductor a plurality of resilient and punctiform, linear or surface bearing contacts are provided. By using a plurality of contacts lying behind one another in longitudinal direction of the conductor the contact is also ensured if irregularities occur when installing the conductor or the power supply bus is installed in a curve, e.g. in a curve of the conveyor belt.

Lastly, it is particularly advantageous if the contacts each have a plurality of contact tabs running perpendicular to the conductor and spaced apart from one another in the longitudinal direction thereof. In this way the current transition resistance can be reduced, as the contact tabs can balance out any unevenness and act electrically as individual, parallel connected contacts.

It should be noted at this point that the variants disclosed of the conveying device and resulting advantages also relate to the embodiments of the operating method according to the invention and vice versa.

Furthermore, it is noted that the disclosed operating methods are not necessarily dependent on a conveying device, as defined in accordance with one aspect of the invention. Thus the said methods can also be applied to conveying devices which have fewer features than the conveying device according to one aspect of the invention. The invention can thus also relate to the following conveying devices corresponding to the methods.

Conveying device, comprising
a first frame profile and a second frame profile spaced apart from the latter,
at least one conveying roller arranged between the frame profiles comprising a drive motor and a brake,
a first electronic control assigned to the drive motor and a second electronic control assigned to the brake, wherein
in a circuit leading to the brake a switching element is provided and the second electronic control is designed to open the switch if a drop of a first voltage below a first predefinable threshold is detected at a power supply input of the brake and/or a drop of a second voltage below a predefinable or predefined second threshold is detected at a power supply input of the second electronic control.

Conveying device, comprising
a first frame profile and a second frame profile spaced apart from the latter,
at least one conveying roller arranged between the frame profiles comprising a drive motor and a brake,
a first electronic control assigned to the drive motor and a second electronic control assigned to the brake, wherein
the second electronic control or a control superordinate to the latter is designed to only fully release or raise the brake on the basis of a command to start up the conveying roller after applying electric voltage to the drive motor after a time delay The embodiments disclosed in the associated methods and the advantages resulting from this apply accordingly to said conveying devices.

For a better understanding of the invention the latter is explained in more detail with reference to the following Figures.

Figure 2:
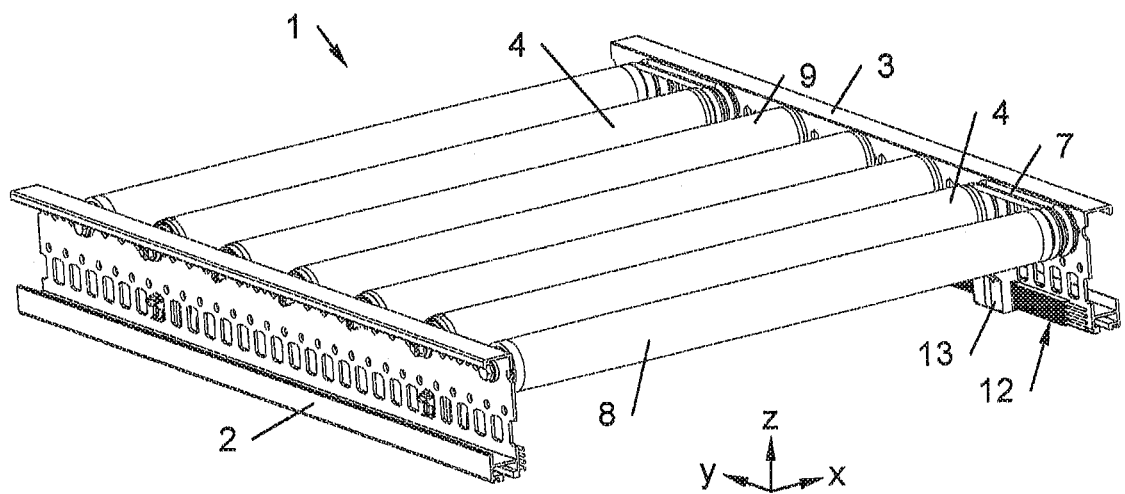
Figure 3:
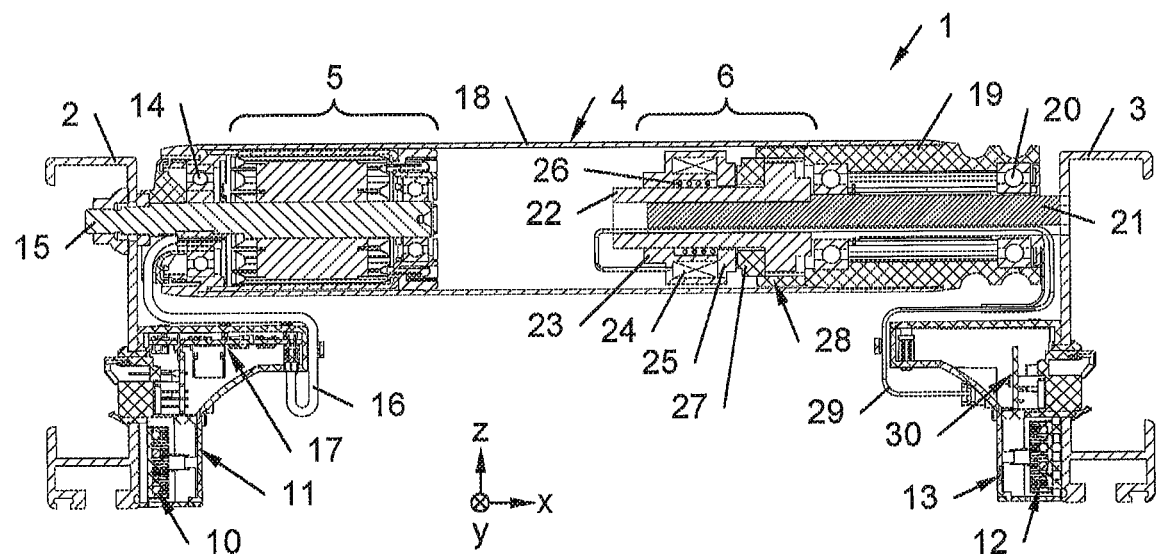
Figure 4:
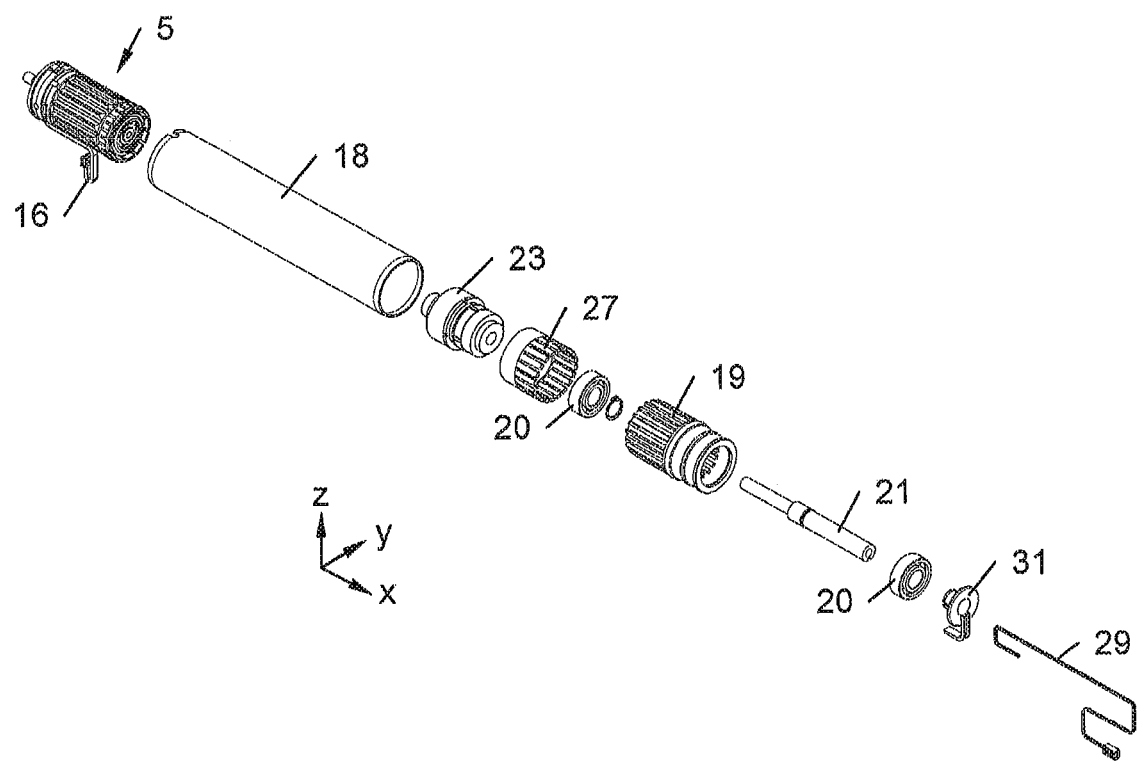
Figure 5:
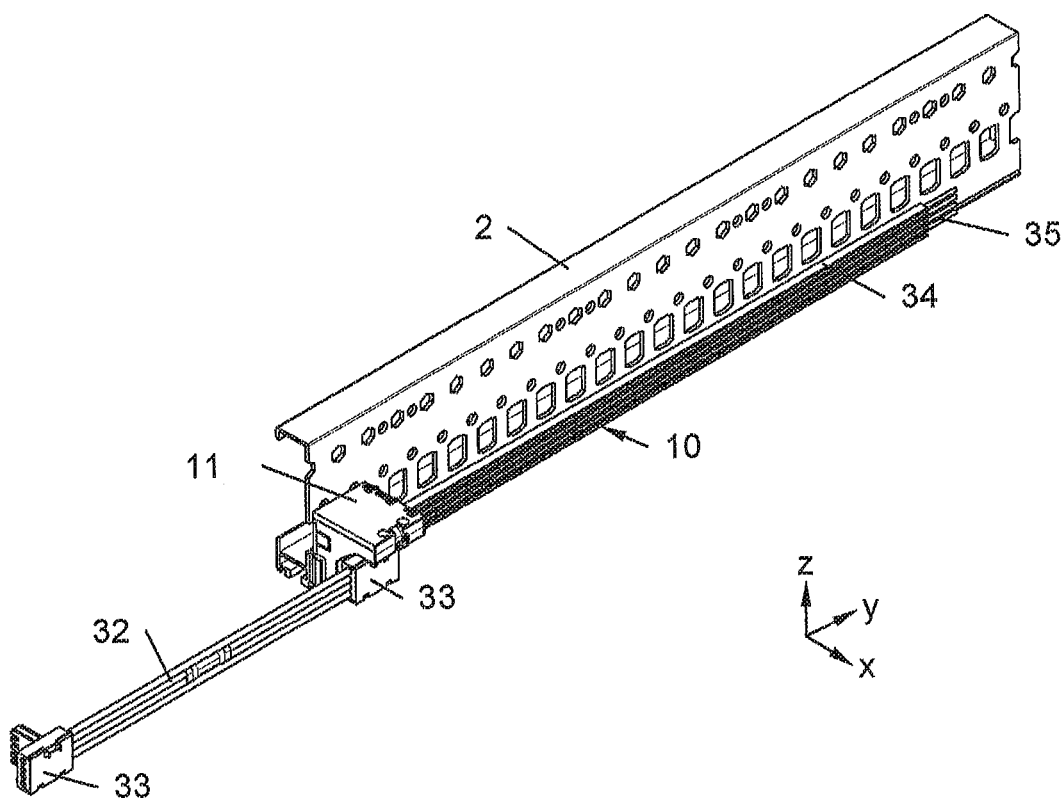
Figure 6:
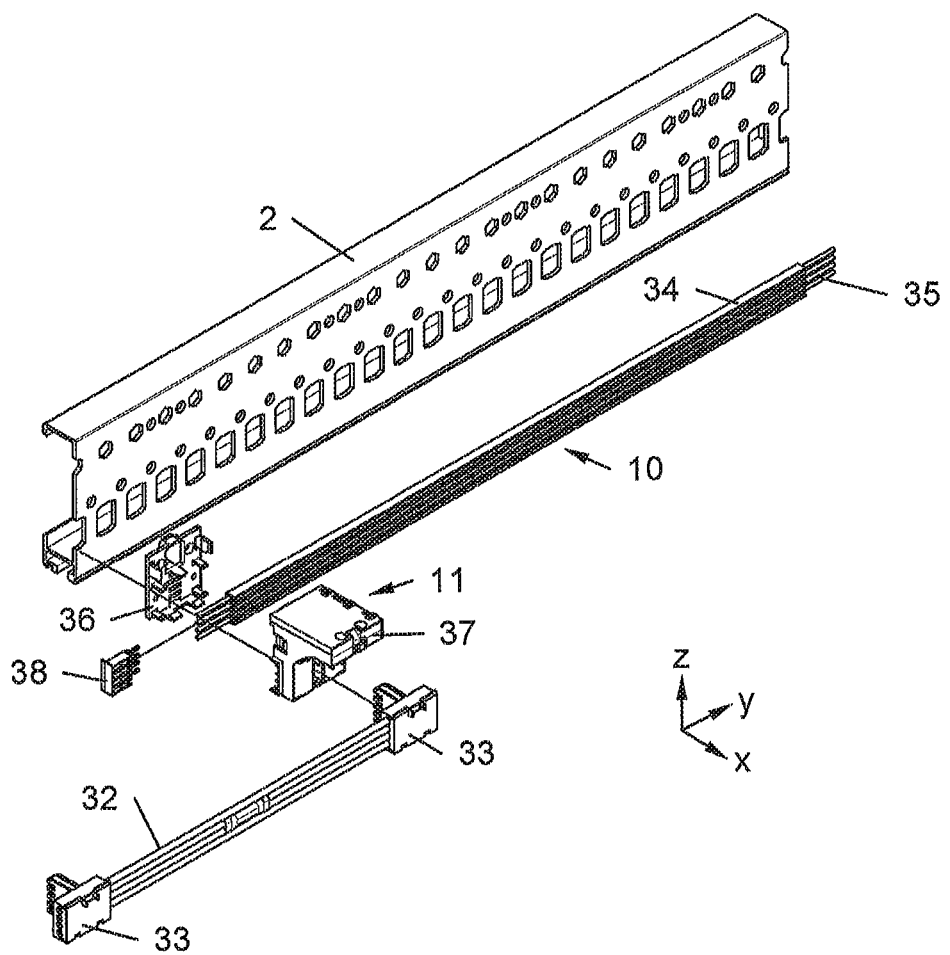
Figure 7:
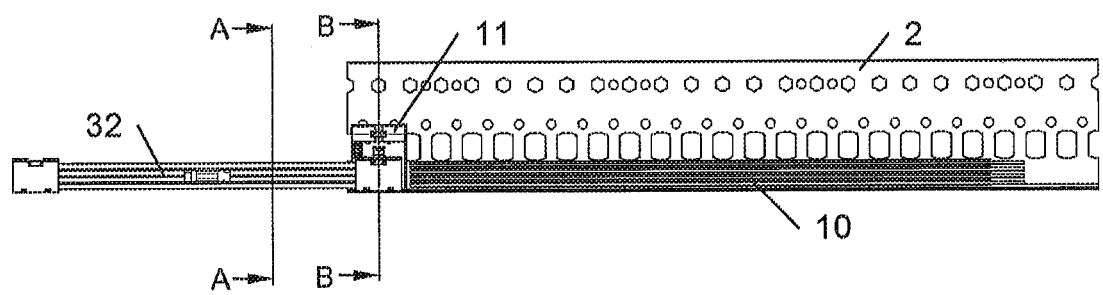
Figure 8:
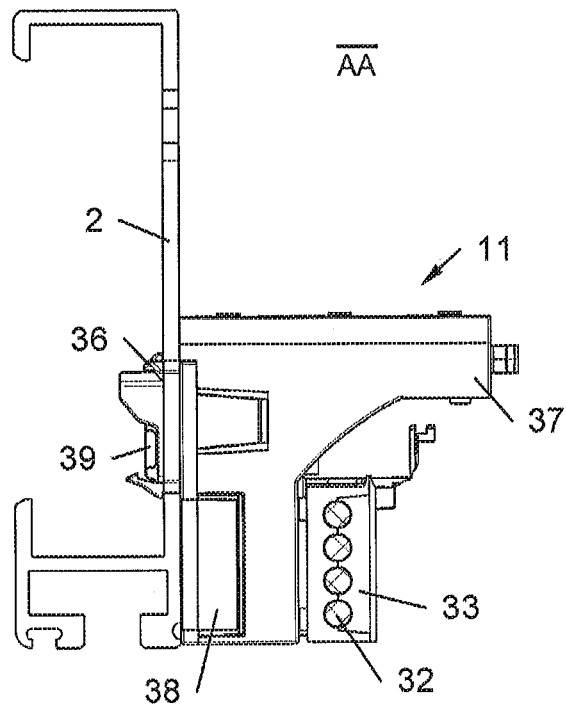
Figure 9:
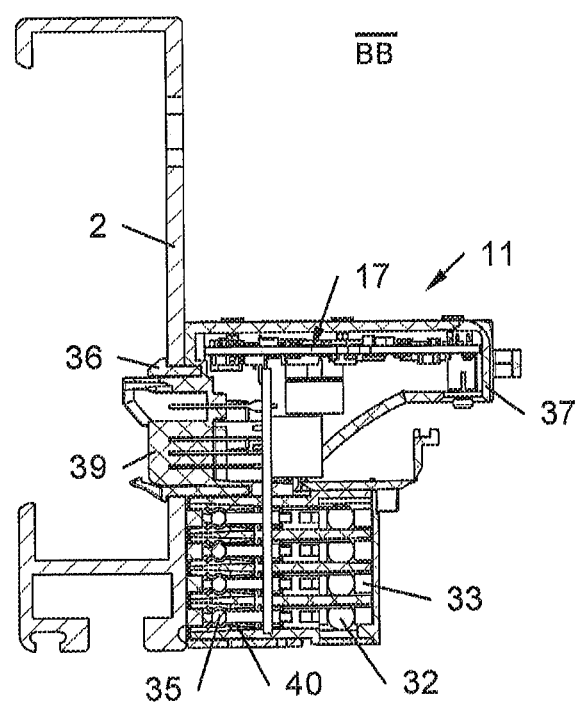
Figure 10:
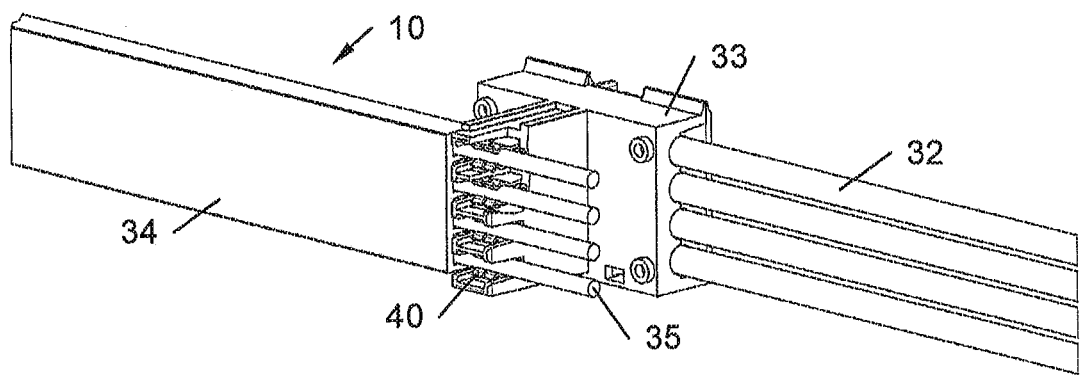
Figure 11:
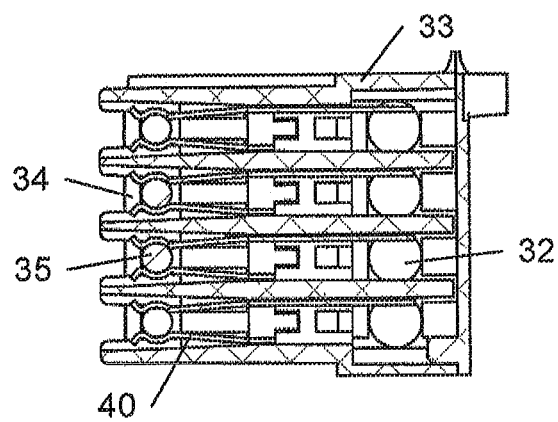
Figure 15:
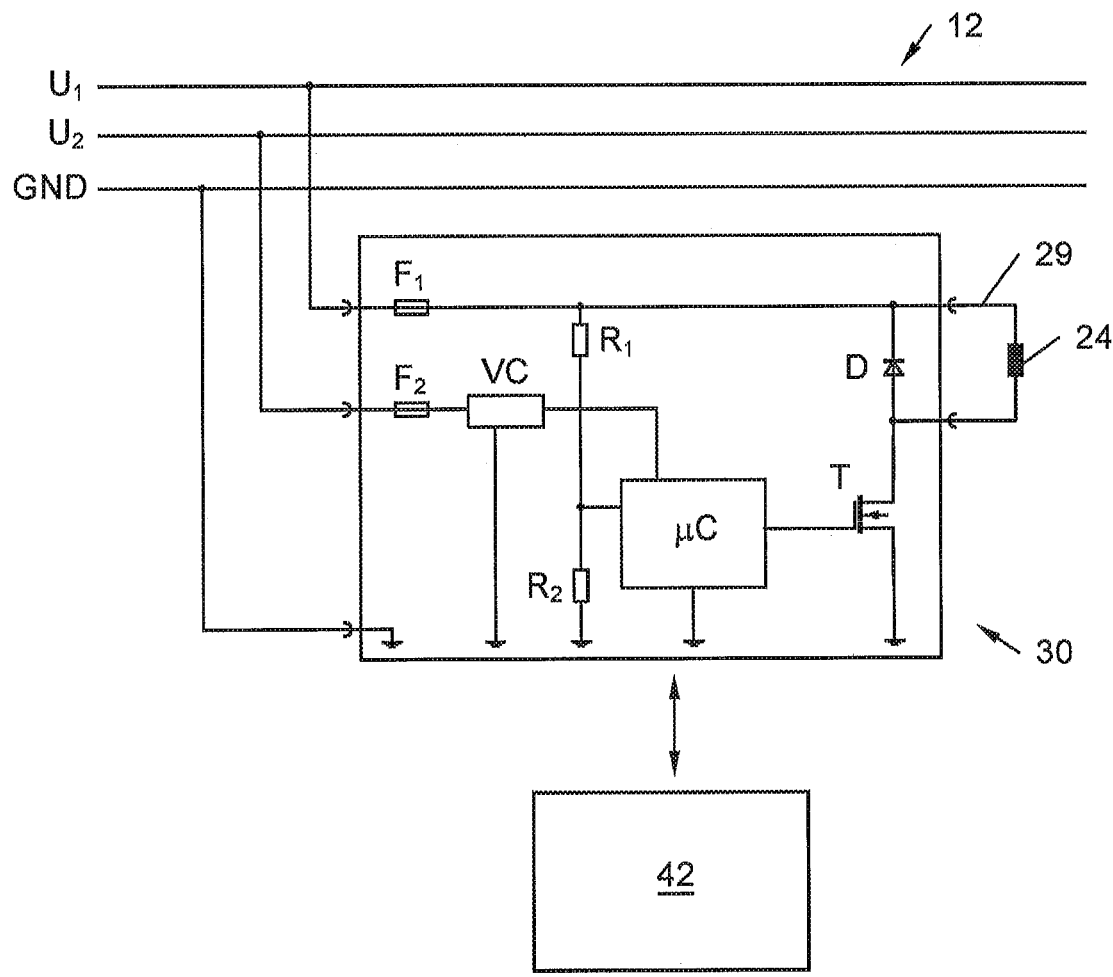
Figure 16:
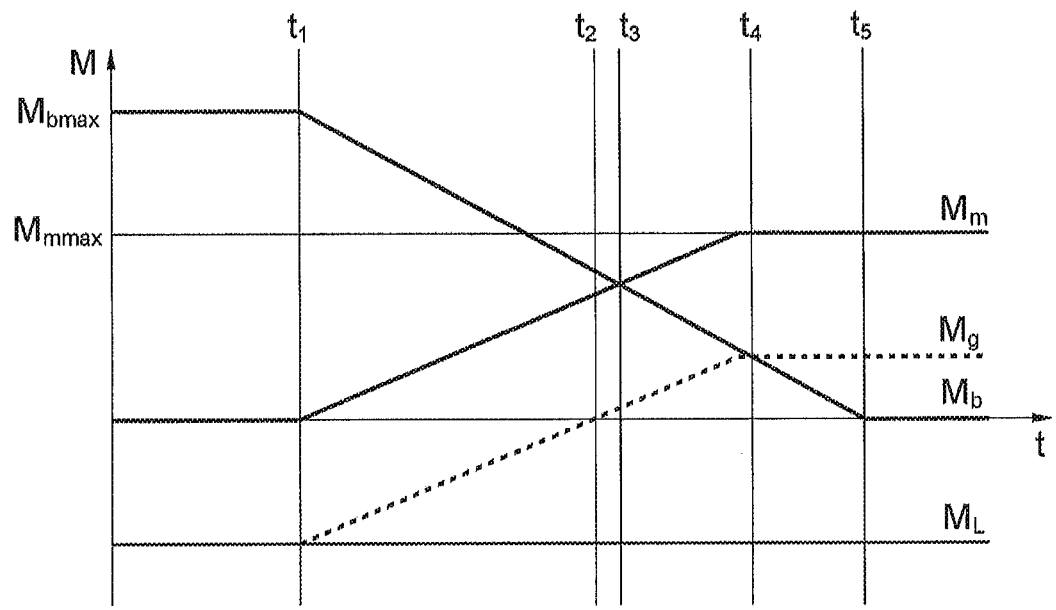
Figure 17:
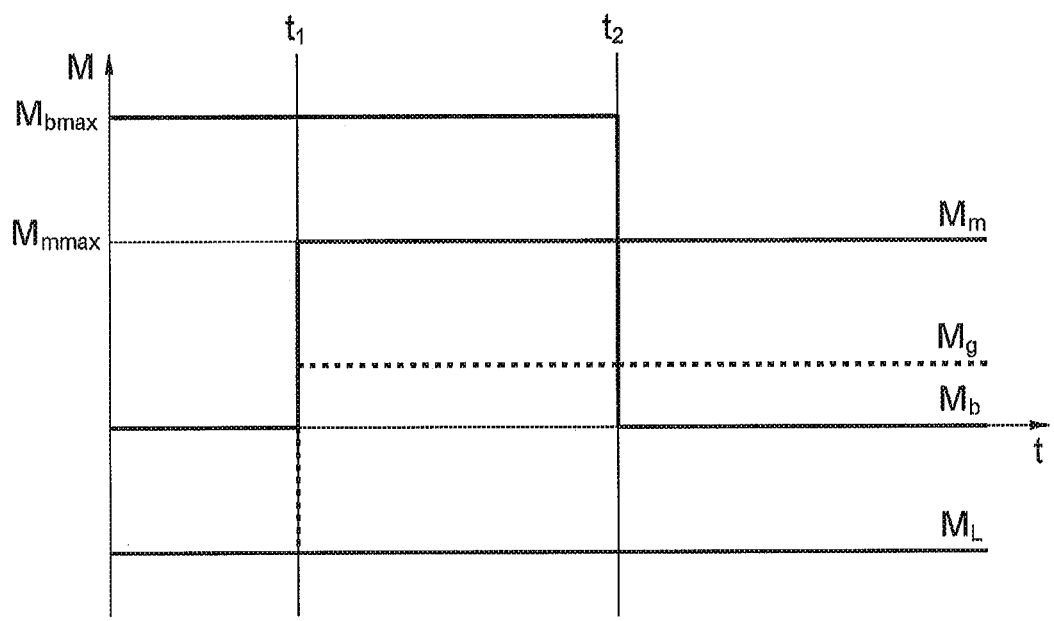
Figure 18:
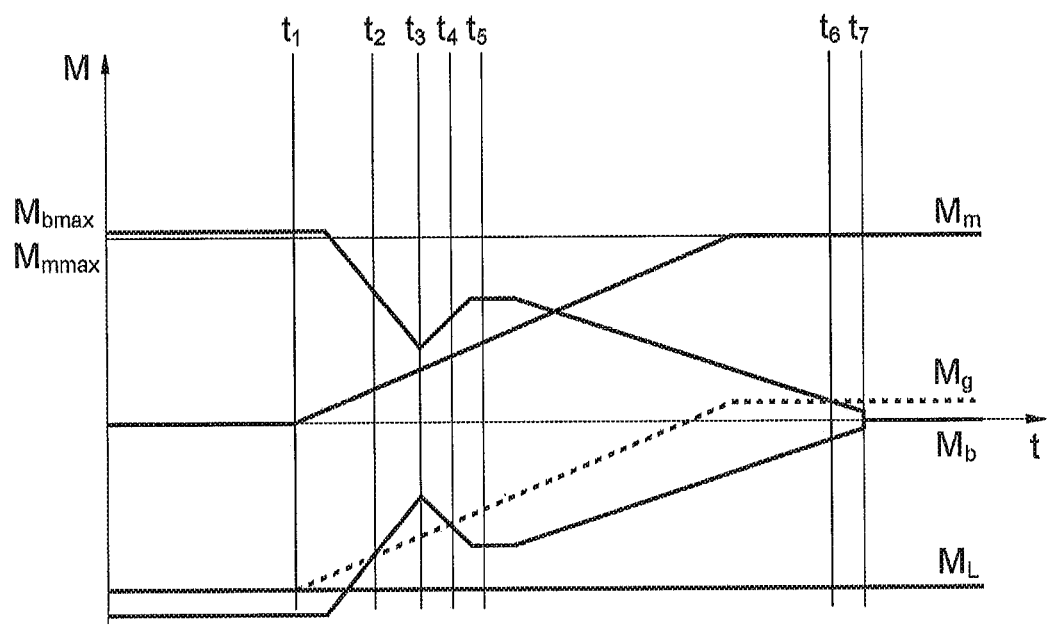
Figure 19:
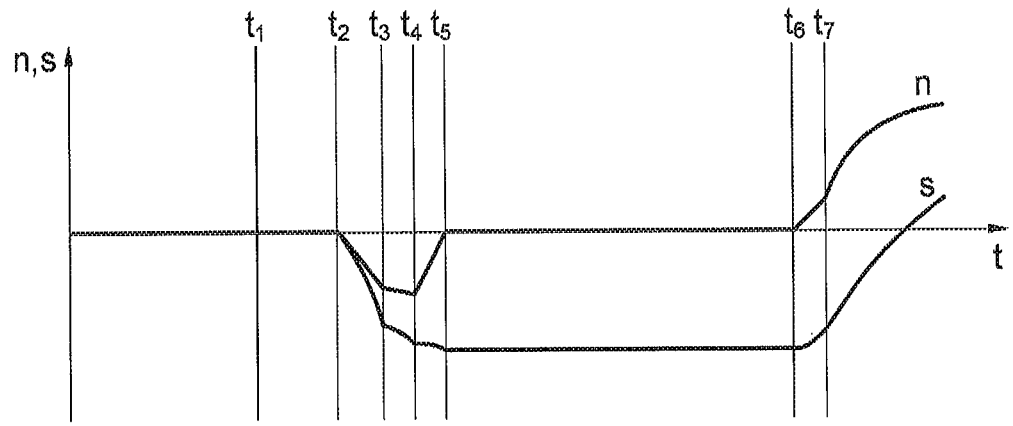

In the latter:
FIG. 1 shows by way of example a section of a conveying device in perspective view from top right;
FIG. 2 as FIG. 1, only from bottom left;
FIG. 3 shows a cross-section of the conveying device of FIG. 1 at the level of a conveying roller;
FIG. 4 shows an exploded view of a conveying roller from FIG. 1 with selected components;
FIG. 5 shows a frame profile with a power supply bus arranged thereon, a connection box for the drive motor of the conveying roller and with a connecting cable for connecting different sections of the power supply bus;
FIG. 6 as FIG. 5, only in exploded view;
FIG. 7 as FIG. 5, only in side view;
FIG. 8 shows a cross-section of the connecting cable and a front view of the arrangement shown in FIG. 5;
FIG. 9 shows a cross-section of the arrangement shown in FIG. 5 at the level of the connection box;
FIG. 10 shows the power supply bus with the connecting cable isolated in perspective from the rear;
FIG. 11 as FIG. 10, only in cross-section;
FIG. 12 shows the power supply bus with a connection box isolated in perspective from the rear;
FIG. 13 shows a connection box in cross-section;
FIG. 14 shows the connection box of FIG. 12 in front view;
FIG. 15 shows an example of an electric circuit diagram of the electronic control for the brake;
FIG. 16 shows the time sequences of the motor torque, load torque, total torque and braking torque with a successive change of the motor torque and braking torque;
FIG. 17 similar to FIG. 16, but with a sudden change of the motor torque and braking torque;
FIG. 18 similar to FIG. 16, but with controlled braking torque and FIG. 19 shows the time sequences of the travel and speed of the conveying roller relative to the example shown in FIG. 18.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

FIGS. 1 and 2 show by way of example a section of a conveying device 1 in perspective view from top right (FIG. 1) and from bottom left (FIG. 2). FIG. 3 also shows a cross-section of the conveying device 1. For orientation purposes an xyz coordinate system is marked in the Figures. The conveying device 1 is generally used for transporting unit goods (not shown), for example containers, cardboard boxes, trays and the like.

The conveying device 1 comprises a first frame profile 2 and a second frame profile 3 spaced apart from the latter. Furthermore, the conveying device 1 comprises a plurality of conveying rollers 4 arranged between the frame profiles 2, 3, at least some of which comprise respectively an electric drive motor 5 and a brake 6. The drive motor 5 and the brake 6 are located on the inside of the conveying roller 4 (see the cross-section at the level of the conveying roller 4 in FIG. 3). The drive motor 5 can be controlled electronically in particular and can also be used specifically for braking the conveying roller 4 and unit goods transported thereby. FIG. 3 also shows that the drive motor 5 is closer to the first frame profile 2 than the second frame profile 3 and the brake 6 is closer to the second frame profile 3 than the first frame profile 2.

Additional non-motorized conveying rollers 8 can be driven over the conveying rollers 4 by means of belts 7. In addition, idling rollers 9 can also be arranged between the frame profiles 2 and 3, as shown in FIG. 1.

In addition, the conveying device 1 comprises a first power supply bus 10 running along the first frame profile 2, which is connected or coupled electrically to the drive motor 5. Specifically the connection of the drive motor 5 to the first power supply bus 10 is performed by means of the first connection box 11.

In addition to the first power supply bus 10 the conveying device 1 comprises a second power supply bus 12, which is placed along the second frame profile 3 and which is connected or coupled electrically to the brake 6. Specifically the connection of the brake 6 to the second power supply bus 12 is performed by means of the second connection box 13.

FIG. 3 shows further details of the construction. For example the (drive) motor 5 is supported by means of bearings 14 on a fixed, first axle 15, which is mounted on the first frame profile 2. By means of a cable 16 the motor 5 is connected to the first connection box 11, or the first, electronic control 17 arranged therein respectively. In particular, the motor 5 can be configured as a structural unit which is arranged on the first side in the roller body 18 of the conveying roller 4 and in particular is inserted into the latter.

For example, the brake 6 is supported by means of bearings 20 on a fixed, second axle 21 which is mounted on the second frame profile 3. By means of a cable 29 the brake 6 is connected to the second connection box 13, or the second, electronic control 30 arranged therein respectively. In particular, the brake 6 can be designed as a structural unit which is arranged on the second side in the roller body 18 of the conveying roller 4 and in particular is inserted into the latter.

The two separate axles 15 and 21 also contribute to a modular construction of the conveying roller 4, as the drive motor 5 (the motor unit) and the brake 6 (the brake unit) are thereby separated from one another not only electrically but also mechanically. The single connecting member between the drive motor 5 and the brake 6 is thus the roller body 18 in this advantageous embodiment.

Furthermore, at the second end of the conveying roller 4 the roller end 19 designed in the form of a belt disc, as shown, can also be supported by bearings 20 on the axle 21. The roller end 19 is inserted into the roller body 18 and fixed to the latter.

The brake 6 comprises in this example the support sleeve 22 fitting tightly on the axle 21, on which support sleeve the stator 23 with an integrated coil 24 is mounted. A first friction disk 25 is mounted displaceably on the support sleeve 22 and is pushed by means of a spring 26 against a second friction disk 27, or the second friction disk 27 is clamped by means of the spring 26 between the first friction disk 25 and the collar of the support sleeve 22. By means of the toothing 28 the second friction disk 27 is connected in a torsionally rigid manner to the pipe end 19 and is also connected in a torsionally rigid or non-rotational manner to the roller body 18. By means of the friction caused by the spring 26 between the second friction disk 27 and the first friction disk 25/support sleeve 22 the roller body 18 is braked relative to the fixed axle 21 (braking position).

By means of the (current-carrying) coil 24 the first friction disk 25 can be lifted against the force of the spring 26 from the second friction disk 27 and the second friction disk 27 is then also no longer pushed against the collar of the support sleeve 22. Between the roller body 18 and the rigid axle 21 there is then (essentially) no further transmission of torque (released/raised position). The coil 24 is connected by means of a cable 29 to the second connection box 13 or to a second electronic control 30 installed therein.

The brake 6 is thus designed as an electromagnetically activated, self-supporting friction brake. The friction brake 6 can be used in principle as an operating brake (i.e. for the active braking of unit goods/objects, which are conveyed on the conveying device 1) and/or as a locking brake (i.e. for holding already unmoved unit goods/objects, which have been braked by means of the motor 6 for example). In addition to the friction brake alternative embodiments are also possible in principle. In particular, the torque can also be transmitted positively between the axle 21 and the roller body 18, if the brake 6 is used as a locking brake. The brake 6 can then be designed for example as a toothed brake or claw brake.

It is also possible for the brake 6 to be used mostly as a parking brake, in exceptional cases however also as an operating brake. For example, moving conveying rollers 4/unit goods can be braked during normal operation by the drive motor 5. In exceptional cases for example if braking is not possible by the drive motor 5 due to the failure of the supply voltage for the latter, the brake 6 is used as an operating brake. For example, it would also be possible with an emergency stop to brake the moving conveying rollers 4/unit goods by means of the drive motor 5 and the brake 6.

In particular, it is also an advantage if the braking torque of the brake 6 is greater than drive torque of the drive motor 5. In this way the conveying roller 4 is prevented from moving if the drive motor 5 is started despite the brake 6 being activated—for example in the case of a fault in the drive. If the brake 6 (for whatever reason) is moved into the braking position, then the conveying roller 4 is also braked with a running drive motor 5 (until it stops), whereby the conveying device 1 is particularly safe to operate.

In addition FIG. 4 shows an exploded view of the conveying roller 4 with selected components, in particular also the not yet mentioned bearing plate 31 bearing externally on the conveying roller 4. The bearing plate 31 comprises a disk-like first section for covering the inside of the roller body 18, which is arranged to be fixed relative to the axle 21 and is oriented to be normal to the latter. In addition, the bearing plate 31 comprises a second section, which projects axially on the first section and comprises a guiding device for the cable 29.

In particular the following features relate to the above and in particular to FIG. 3:

The drive motor 5 is separated electrically from the brake 6 inside the conveying roller 4. This means that inside the conveying roller 4 no electrical connection is formed between the drive motor 5 and the brake 6. In particular, in the conveying roller 4 there is also no power supply bus between the drive motor 5 and brake 6.

Furthermore, the conveying device 1 comprises the first electronic control 17 assigned to the drive motor 5 and the second electronic control 30 assigned to the brake 6, wherein the first electronic control 17 is separated electrically from the second electronic control 30 inside the conveying roller 4. This means that inside the conveying roller 4 there is no electrical connection between the first electronic control 17 and the second electronic control 30.

In this example the first electronic control 17 is arranged on the first frame profile 2 (indirectly via the first connection box 11), and the second electronic control 30 is arranged on the second frame profile 3 (indirectly via the second connection box 13).

It would also be possible for the first electronic control 17 to be arranged inside the conveying roller 4 and be closer to the first frame profile 2 than the second frame profile 3. In particular, the first electronic control 17 in FIG. 3 could be arranged to the left of the drive motor 5.

Furthermore, it would also be possible for the second electronic control 30 to be arranged inside the conveying roller 4 and be closer to the second frame profile 3 than the first frame profile 2. In FIG. 3 the second electronic control 30 could therefore be arranged in particular to the right of the brake 6.

It is also advantageous if the cabling 16 assigned to the drive motor 5 (and on installation into the conveying roller 4 possibly the first electronic control 17) is guided out of the conveying roller 4 solely on the side of the conveying roller 4 (here left) closer to the first frame profile 2. Furthermore, it is an advantage if the cabling 29 assigned to the brake 6 (and on installation into the conveying roller 4 possibly the second electronic control 30) is guided out of the conveying roller 4 solely on the side of the conveying roller 4 (here right) closer to the second frame profile 3.

Overall the assembly of the conveying roller 4 is simplified by its special structure as there is no need to thread a connecting cable between the motor 5 and brake 6 through the roller body 18. In addition, the cabling to the drive motor 5 and the cabling to the brake 6 are independent of the length of the conveying roller 4, as the cables 16 and 29 are supplied from both sides. If—as a rough guideline—the distance of the conveying rollers 4 in conveying direction y is smaller than their length, which is the case particularly with powerful systems, by means of the special structure of the conveying device 1 it is also possible to reduce the number of electric cables, as the portion added for the brake 6 by the second power supply bus 12 is smaller than an alternative cabling through the roller body 18.

In addition it should also be noted that, as well as the first and second power supply buses 10 and 12, data buses (not shown) can also be laid along the first frame profile 2 or along the second frame profile 3 in order to transmit data signals between a superordinate control 42 (see also FIG. 15) and the first electronic control 17 or the second electronic control 30. In addition, over the course of the conveying device 1 photodetectors (also not shown) can be arranged in order to determine the occupied state of a conveyor section.

In addition, it should also be noted that the conveying rollers 4 are all installed in the same position between the first and the second frame profile 2 and 3. In the specifically shown example the motors 5 of the conveying roller 4 are all arranged on the left side, whereas the brakes 6 are arranged on the right side 6. Of course, the brakes 6 can also be arranged on the left and the motors 5 on the right. It would also be possible to have several drive motors 5/brakes 6 on the left and several brakes 6/drive motors 5 on the right. This is possible in particular if the first power supply bus 10 and the second power supply bus 12 or data buses laid along the frame profiles 2 and 3 have the same structure.

FIG. 5 shows a detail of the conveying device 1, specifically the frame profile 2 with the first power supply bus 10 arranged thereon, a first connection box 11 and a connecting cable 32, which connects several sections of the power supply bus 10 to one another. In addition, plugs 33 are arranged on the connecting cable 32 which can be inserted into the connection boxes 11. It is also shown in FIG. 5 that the power supply bus 10 comprises an isolator 34 running along the frame profile 2 with a plurality of mounts open on the longitudinal side, in which a plurality of conductors 35 are arranged, wherein a conductor 35 is arranged in each mount. By means of the connection boxes 11 the conductors 35 are connected electrically to the first electronic control 17. Advantageously each (motorized) conveying roller 4 has a connection box 11 and each connection box 11 is connected to the conductors 35. It is also possible of course for one connection box 11 to be provided for a plurality of conveying rollers 4.

FIG. 6 shows the section of the conveying device 1 already shown in FIG. 5 in an exploded view. In FIG. 6 it can be seen that the connection box 11 comprises a base plate 36 and an attachment part 37. In addition, it is also shown that the power supply bus 10 is closed by an end cap 38.

On the assembly of the conveying device 1 first of all the base plates 36 are secured onto/into the frame profile 2 (e.g. clipped in by means of a locking connection). Afterwards the power supply bus 10 is mounted and contacted by fitting on the attachment part 37, in particular by means of the first electronic control 17 (see also FIGS. 12 to 14). Different sections of the power supply bus 10 can then be connected to one another finally by inserting a connecting cable 32.

FIG. 7 shows the arrangement already illustrated in FIGS. 5 and 6 in side view, FIG. 8 shows a cross-section AA and FIG. 9 shows a cross-section BB. FIGS. 8 and 9 show clearly the base plate 36 projecting through the frame profile 2 and its locking connection in the frame profile 2. Furthermore, a socket 39 for a databus is also shown which is arranged externally on the frame profile 2 and is thus arranged opposite the power supply bus 10. Furthermore, FIG. 9 also shows contacts 40 of the plug 33 which are resilient and which grip around the conductor 35. Lastly, also the first electronic control 17 arranged (optionally) in the connection box 11 is shown which is also used for communicating with a superordinate control 42 (compare FIG. 15) and for controlling the drive motor 5. The conductors 35 have an identical design in this example. In principle however it is also possible to use different conductors 35, in particular with a different cross-section.

FIG. 10 shows the power supply bus 10 with the connecting cable 32 in isolation in perspective from the rear, FIG. 11 shows the same arrangement in cross-section. FIGS. 10 and 11 show particularly clearly that the cross-section of the conductors 35 is circular. This is advantageous, however the cross-section could also be essentially rectangular, quadratic, hexagonal or octagonal and oval (e.g. ellipsoid) for example.

Generally the form factor f of the conductor 35, which is defined as a quotient of the circumference of a circle with an equivalent area to the cross-section of the conductor 35 and the circumference of the said cross-section of the conductor 35 is advantageously in the range of f=0.88 to f=1.00. If the conductor 35 has a circular cross-section the form factor is thus f=1.00.

For example if the conductor 35 has a quadratic cross-section of 1 mm×1 mm, said area is A=1 mm² and its circumference U=4 mm. The diameter of the area-equivalent circle is $$d = \sqrt{\frac{4 \cdot A}{\pi}} = \sqrt{\frac{4}{\pi}} = 1.13 \text{ mm}$$

Its circumference U is

U=d·π=1.13·π=3.54 mm

The form factor f is thus $$f = \frac{U_K}{U_L} = \frac{3.54}{4.00} = 0.89$$

It is also shown in particular in FIG. 10 that the spring contacts 40, which grip around the conductors 35, each have a plurality of contact tabs which are designed to be fork-like with contact tabs running perpendicular to the conductor 35 and spaced apart from one another in the longitudinal direction of the conductor 35, which have the approximate form of fork tines. In this way, the current transition resistance can be reduced as the contact tabs are particularly effective at balancing out unevenness and operate electrical and individual, parallel connected contacts. Advantageously individual contact tabs also improve the electric contact, when the conveyor belt and thus the power supply bus 10 run in a curve.

It is also advantageous if, as shown in FIG. 11—the free bending length of the contact 40 or the contact tabs corresponds to about three to four times the diameter of the said area-equivalent circle. In this way there can be a good compromise between the current-carrying capacity of the contact 40 and its bearing force on the conductor 35.

FIG. 12 shows the power supply bus 10 again isolated in perspective from the rear, but here in association with a connection box 11. According to this embodiment the first electronic control 17 is arranged inside the connection box 11 and connected electrically to contacts 41, which bear spring-like on the conductors 35. The contacts 41 can be formed as shown for example by contact brackets. It is particularly advantageous in this case, if—as shown in FIG. 12—a plurality of contacts 41 are provided for each conductor 35 (here in particular two), which are connected electrically inside the connection box 11. For example, the contacts 41 can be made from a single copper strip. By using a plurality of contacts 41 arranged behind one another in the longitudinal direction of the conductor 35 contact is also possible if when laying the conductor 35 there is any unevenness or the power supply bus 10 is arranged in a curve, e.g. in a curve of the conveyor belt.

FIGS. 13 and 14 show the connection box 11 in detail (FIG. 13 in cross-section, FIG. 14 in front view). The contacts 41 bearing spring-like on the conductors 35 are shown particularly clearly in FIG. 13. For the upper contact 41 shown in FIG. 13 two positions are shown, on the one hand the unloaded position and on the other hand the position adopted when bearing on the conductor 35.

The contacts 41 shown in FIGS. 12 to 14 bear linearly on the conductor 35. It would also be possible for the latter to bear on the latter in a punctiform manner or also flat.

The technical teaching disclosed in FIGS. 5 to 14 has been explained with reference to the left side of the conveying device 1 assigned to the drive motor 5. The latter can however also be used without restriction on the right side of the conveying device 1 assigned to the brake 6. The second frame profile 3 is then in place of the first frame profile 2, the second power supply bus 12 is then in place of the first power supply bus 10, the second connection box 13 is then in place of the first connection box 11, the second electronic control 30 is in place of the first electronic control 17 and the brake 6 is in place of the drive motor 5. The first connection box 11 and the second connection box 13 can have the same external dimensions and same contacts 40 and 41 in particular. Also the first power supply bus 10 and the second power supply bus 12 can have the same external dimensions and the same placement of the conductor 35. Lastly, also the (optional) second electronic control 30 arranged in the connection box 13 can also be used for communicating with the superordinate control 42 (cf. FIG. 15) and the control of the brake 6.

Generally, it is an advantage if the first power supply bus 10 comprises respectively at least three mutually isolated conductors 35, wherein a first conductor 35 is connected to a power supply input of the drive motor 5, a second conductor 35 is connected to a power supply input of the first electronic control 17 and at least a third conductor 35 is connected to a ground connection of the said assemblies. Generally, it is also an advantage alternatively or additionally if the second power supply bus 12 has respectively at least three mutually isolated conductors 35, wherein a first conductor 35 is connected to a power supply input of the brake 6, a second conductor 35 is connected to a power supply input of the second electronic control 30 and at least a third conductor 35 is connected to a ground connection of the said assemblies. In this way the drive motor 5 and the brake 6 can be operated at a first voltage and the first electronic control 17 assigned to the drive motor 5 and/or the second electronic control 30 assigned to the brake 6 are operated at a second, lower voltage. In particular, the first voltage can have a value of 48V and the second voltage can have a value of 24V.

It is advantageous if a circuit carrying the first voltage (e.g. 48V) which contains the brake 6 is separated if a drop of the first voltage (also e.g. 48V) below a first predefinable threshold is detected and/or a drop of the second voltage (also e.g. 24V) below a second predefinable or predefined threshold is detected or determined.

FIG. 15 shows by way of example an embodiment of the second electronic control 30, which is connected electrically to the second power supply bus 12. The part of the second control 30 connected to the second voltage $U_2$ comprises in particular two fuses $F_1$ and $F_2$, a voltage controller VC, which from a second voltage $U_2$ of 24V generates a voltage of 5V for example, a microcontroller µC, a transistor T, a free-wheeling diode D and a voltage divider $R_1$ and $R_2$. By means of line 29 the coil 24 of the brake 6 is connected parallel to the free-wheeling diode D.

The function of the circuit shown is now as follows:

By means of the voltage divider $R_1$, $R_2$ and the microcontroller µC the level of the first voltage $U_1$ is monitored. If the latter falls below a predefined value, the microcontroller µC switches off the coil 24 from the voltage supply by means of the transistor T. As the brake 6 is designed to be self-supporting, the conveying roller 4 is then stopped (braking position).

However, the transistor T also switches off the coil 24 from the first voltage $U_1$, when the second voltage $U_2$ falls below a specific (predefined) value and the microcontroller µC can no longer be operated.

Thus the transistor T forms in this example a switching element, which lies in a circuit leading to the brake 6 and is opened when a drop of the first voltage $U_1$ below a first predefinable threshold is detected at a power supply input of brake 6 and also when a drop of the second voltage $U_2$ below a second predefinable/predefined threshold is detected or determined at a power supply input of the second electronic control 30. The operation of the conveying roller 4 is thus particularly reliable. The second voltage $U_2$ can of course also be measured actively, in order to be able to detect a drop of the latter below a second predefinable threshold.

The measures taken are explained with reference to the second electronic control 30 and the brake 6, Of course, the latter can also be used in a similar way for the first electronic control 17 and the drive motor 5. The latter can also be taken out of operation if the first voltage $U_1$ and/or second voltage $U_2$ fall below predefinable thresholds.

It is also particularly advantageous if the second electronic control 30 or a superordinate control 42 is configured to only fully release or raise the brake 6 after a time delay on the basis of a command to start up the conveying roller 4 after applying electric voltage to the drive motor 5. This means that on the basis of a command from a superordinate control 42, for example a main computer, to start up the conveying roller 4 first of all electric voltage is applied to the drive motor 5 and then the brake 6 is fully released or raised after a time delay.

For example, the command to start up the conveying roller 4 can (only) be received by the first electronic control 17, which derives from the latter a signal to the second electronic control 30 for the time-delayed releasing/raising of the brake 6, The time-delay can thus be performed in the first electronic control 17, in that the said signal is transmitted with a suitable delay to the second electronic control 30. The time delay can however also be performed in the second electronic control 30, in that the brake 6 is released/raised after a time delay after receiving the said signal. With regard to the signal for releasing/raising the brake 6, the first electronic control 17 in this embodiment can be seen to be superordinate to the second electronic control 30.

It is also possible that the command sent by the superordinate control 42 for starting up the conveying roller 4 is received virtually simultaneously by the first electronic control 17 and the second electronic control 30 and the second electronic control 30 releases/raises the brake 6 after a time delay after receiving the command.

The superordinate control 42 can also be for example a controller of several conveying rollers 4 which is controlled in turn by a main computer. For example, said controller can take over the control of the first electronic control 17 and the second electronic control 30 with regard to the time-delayed releasing/raising of the brake 6.

In the end the "intelligence" for performing the time-delayed release/raising of the brake 6 can be included in the first electronic control 17, in the second electronic control 30 or in the superordinate control 42.

The data connection between the superordinate control 42 and the second electronic control 30 is indicated simply in FIG. 15 by a double arrow. The data connection between the superordinate control 42 and the first electronic control 30 can be performed in a similar way. If the first electronic control 17 functions as a superordinate control, there is a data connection from the latter to the second electronic control 30. The data connections can be wired in a known manner or can also be wireless, in particular via bus messages.

At this point it should be noted in particular that the said time delay relates to the complete release or raising of the brake 6 and the release of the brake can also be initiated when applying voltage to the drive motor 5 or even before.

FIG. 16 shows a first example of the processes performed by means of a time torque path of the motor torque $M_m$ produced by the drive motor 5, of the load torque $M_L$ produced by a unit good (load) located on the conveying roller 4, the resulting total torque $M_g=M_m+M_L$, and the braking torques $M_b$ produced by the brake 6. In this example at a time point $t_1$ the motor torque $M_m$ begins to increase successively (here linearly) to a constant end value and to lower the braking torque $M_b$ successively (here linearly) to the value zero.

In general, a desired motor torque $M_m$ or braking torque $M_b$ can be achieved by applying a corresponding gate voltage to the transistor T. However, it is also possible that the transistor T is switched on and off in a known manner with a variable duty cycle, in order to simulate a virtually continuous control signal. Both can be performed by the microcontroller µC.

It is also possible that the voltage in the coil 24 is lowered (e.g. by half), when the brake 6 is completely released/raised, to save electricity. To keep the first friction disk 25 in the open position generally a lower magnetic field is required than for moving the latter out of the braking position.

Preferably, the maximum braking torque $M_{bmax}$, as shown in FIG. 16, is above the maximum motor torque $M_{mmax}$ produced by the drive motor 5. In this way, the conveying roller 4 can be stopped each time in case of a defect in the first electronic control 17.

At time point $t_2$ the motor torque $M_m$ and the load torque $M_L$ are in balance, it would in fact no longer be necessary to the hold the brake 6 from this time point. At time point $t_3$ the motor torque $M_m$ and the braking torque $M_b$ are in balance.

Without load torque $M_L$ the conveying roller 4 would still be stopped in this state. At time point $t_4$ the total torque $M_g$ finally exceeds the braking torque $M_b$, and the conveying roller 4 begins to rotate. At time point $t_5$ the brake 6 is finally fully opened/raised. Of course the diagram in FIG. 16 is purely illustrative, and many other different torque progressions are possible. For example a successive change of the motor torque $M_m$ or the braking torque $M_b$ can also deviate from the linear form. Also the braking process can be initiated after time point $t_1$ or even before. With this kind of control the startup process of the conveying roller 4 is particularly gentle.

FIG. 17 shows a further example of the processes occurring when starting up conveying roller 4 with reference to additional time torque paths. Here the motor torque $M_m$ is increased suddenly at a time point $t_1$ to a predefined or predefinable value. As a result the brake 6 is released/lifted at a later time point $t_2$ by a step-like control signal in one step. In this way the control technology required for starting up the conveying roller 4 can be kept to a minimum. In principle, the motor torque $M_m$ in FIG. 17 could also change differently, for example successively. The release of the brake 6 can also then be performed with a time delay to $t_1$. In general, a time delay is measured for example from the time of receiving a start up signal, which is received by a superordinate control 42.

It would also be possible for the brake 6 to be released/raised by a step-like control signal in one step, if the motor torque $M_m$ output by the drive motor 5 has a predefinable value. For example this could be in FIG. 16 reaching the constant value of the motor torque $M_m$ shortly before $t_4$. It should also be mentioned that a step-like control signal for the drive motor 5 does not necessarily lead to a step in the torque path $M_m$. Rather the motor torque $M_m$ is increased successively in reality even with a step-like control signal.

It is also possible in one embodiment variant that by means of generator current created when braking a unit good by the drive motor 5 the weight of the unit good or the load torque $M_m$ caused by the latter is calculated and as a result is used for the following start-up process. Accordingly, the release/raising of the brake 6 with light unit goods can be performed more rapidly than with heavy unit goods. In FIG. 16 the braking torque $M_b$ can thus be lowered more rapidly than with heavy loads, without causing an unwanted backwards rotation of the conveying roller 4. Similarly the time span between $t_1$ and $t_2$ in FIG. 17 with light unit goods are selected to be shorter than for heavy unit goods.

FIGS. 18 and 19 show a further example of the processes occurring when starting up the conveying roller 4 with reference to further time torque paths (FIG. 18) and with reference to a travel diagram or speed diagram (FIG. 19).

In this variant a rotation of the conveying roller 4 is monitored during the start up process. A time gradient of the braking torque $M_b$ is lowered with rotations, which are in the same direction as the motor torque $M_m$ output by the drive motor. With rotations in opposite direction to the motor torque $M_m$ output by the drive motor, the gradient of the braking torque $M_b$ is increased and in particular also reversed.

In this example at time point $t_1$ the motor torque $M_m$ starts to increase linearly to a constant value. Slightly later the braking torque $M_b$ is decreased with a relatively sharp drop (gradient). As the braking torque $M_b$ is not dependent on the direction and opposes both a forwards rotation of the conveying roller 4 and a backwards rotation, the braking torque $M_b$ is also shown in FIG. 18 in mirror image about the t-axle. It can be seen from the mirror image that the absolute value of the total torque $M_g$ exceeds the absolute value of the braking torque $M_b$ at time point $t_2$, and the conveying roller 4 due to the negative value of the total torque $M_g$ begins to rotate backward against the desired conveying direction. In FIG. 19 this can be seen from the paths of travel s and the speed n. Said (actually unwanted) rotation of the conveying roller 4 is detected by the second electronic control 30, and as a result the braking torque $M_b$ is increased at time point $t_3$, specifically the gradient of the braking torque $M_b$ is even reversed here. At time point $t_4$ the absolute value of the braking torque $M_b$ exceeds the absolute value of the total torque $M_g$, whereby the rotation of the conveying roller 4 is braked and finally stopped at time point $t_5$. At time point $t_6$ the (positive) total torque $M_g$ exceeds the braking torque $M_b$, whereby the conveying roller 1 begins to rotate in conveying direction. At time point $t_7$ the gradient of the braking torque $M_b$ is therefore lowered and the brake 6 is fully released/raised in one step. As shown in FIG. 18 the absolute value of the time gradient of the braking torque $M_b$ when releasing the brake 6 is decreasing apart from brief exceptions.

Generally, it should be noted that the present invention relates in particular to inclined conveyor belts, i.e. sections that rise or fall in conveying direction. The conveying device 1 comprises a first frame profile 2 and a second frame profile 3 and a roller conveyor belt formed between the latter by the conveying rollers 4, 8, 9, which can also form a rising or falling section. In particular in said sections only conveying rollers 4 or only conveying rollers 4 and 8 can be provided.

The embodiments show possible embodiment variants of a conveying device 1 and a method for operating the latter, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection. Aspects which only relate to the conveying roller 4 can also be supported by a claim relating solely to the conveying roller 4.

In particular, it should be noted that the conveying device 1 in reality can also comprise more or fewer components than shown.

Finally, as a point of formality, it should be noted that for a better understanding of the structure of the conveying device 1, the latter and its components have not been represented true to scale in part and/or have been enlarged and/or reduced in size.

The underlying problem addressed by the independent solutions according to the invention can be taken from the description.

LIST OF REFERENCE NUMERALS 1 conveying device
2 first frame profile
3 second frame profile
4 (motorized) conveying roller
5 drive motor
6 brake
7 belt
8 (non-motorized) conveying roller
9 idling roller
10 first power supply bus
11 first connection box 12 second power supply bus
13 second connection box
14 bearing
15 (motor) axle
16 (motor) cable
17 first electronic control
18 roller body
19 roller end
20 bearing
21 second axle
22 support sleeve
23 stator
24 coil
25 first friction disk
26 spring
27 second friction disk
28 toothing
29 cable
30 second electronic control
31 bearing plate
32 connecting cable
33 plug
34 isolator
35 conductor
36 base plate
37 attachment part
38 end cap
39 socket for databus
40 contact
41 contact
42 superordinate control/main computer
μC microcontroller
D free-wheeling diode
$F_1, F_2$ fuse
GND ground connection
$R_1, R_2$ voltage divider
T transistor
$U_1$ first voltage
$U_2$ second voltage
VC voltage controller
M torque
$M_b$ braking torque
$M_{bmax}$ maximum braking torque
$M_g$ total torque
$M_L$ load torque
$M_m$ motor torque
$M_{mmax}$ maximum motor torque
n speed
s path
t time

The invention claimed is:

1. A conveying device comprising
a first frame profile and a second frame profile spaced apart from the first frame profile,
at least one conveying roller arranged between the first and second frame profiles and comprising a drive motor and a brake,
a first electronic control assigned to the drive motor, and a second electronic control assigned to the brake,
wherein the second electronic control or a control superordinate to the second electronic control is designed to fully release or raise the brake on the basis of a command to start up the conveying roller only after a time delay after the application of voltage to the drive motor.

2. The conveying device as claimed in claim 1, wherein:
the drive motor is closer to the first frame profile than the second frame profile,
the brake is closer to the second frame profile than the first frame profile,
a first power supply bus runs along the first frame profile and is connected or coupled electrically to the drive motor, and
a second power supply bus runs along the second frame profile and is connected or coupled electrically to the brake.

3. The conveying device as claimed in claim 2, wherein the first electronic control is separated electrically from the second electronic control inside the conveying roller.

4. The conveying device as claimed in claim 2, wherein the first electronic control is arranged on the first frame profile and/or the second electronic control is arranged on the second frame profile.

5. The conveying device as claimed in claim 2, wherein the first electronic control is arranged on the inside of the conveying roller, and the first electronic control is closer to the first frame profile than the second frame profile, and/or
wherein the second electronic control is arranged on the inside of the conveying roller, and the second electronic control is closer to the second frame profile than the first frame profile.

6. The conveying device as claimed in claim 2, wherein the brake is designed as an electromagnetically operated, self-holding friction brake.

7. The conveying device as claimed in claim 2, wherein a maximum braking torque of the brake is greater than a maximum motor torque of the drive motor.

8. The conveying device as claimed in claim 2, wherein the first power supply bus and/or the second power supply bus has an isolator running along the first frame profile or along the second frame profile with a plurality of mounts open on the longitudinal side and a plurality of conductors arranged in the isolator, and
wherein a conductor is mounted in each mount.

9. The conveying device as claimed in claim 8, wherein the form factor f of a conductor, which is defined as a quotient of the circumference of a circle with an equivalent area to the cross-section of the conductor and the circumference of said cross-section of the conductor, is in the range of f=0.88 to f=1.00.

10. The conveying device as claimed in claim 9, wherein the cross-section of a conductor is polygonal.

11. The conveying device as claimed in claim 9, wherein the cross-section of a conductor is oval.

12. The conveying device as claimed in claim 9, wherein an electrical connection to the drive motor, the brake, the first electronic control and/or the second electronic control is performed via resilient contacts bearing punctiformly, linearly or flat on the conductors.

13. The conveying device as claimed in claim 9, wherein the electrical connection of several sections of conductors is performed via resilient contacts gripping around the conductors.

14. The conveying device as claimed in claim 13, wherein the resilient contacts comprise respectively a plurality of contact tabs which are transverse to the conductor and spaced apart from one another in a longitudinal direction of the conductor.

15. The conveying device as claimed in claim 2, wherein the first and the second power supply bus each has at least three conductors which are isolated from one another,
wherein a first conductor is connected to a power supply input of the drive motor and/or the brake, wherein a second conductor is connected to a power supply input of the first electronic control and/or the second electronic control, and wherein at least one third conductor is connected to a ground connection of the drive motor, the brake and the first and second electronic control.

16. The conveying device as claimed in claim 2, wherein in a circuit leading to the brake a switching element is provided and wherein the second electronic control is designed to open the switching element if a drop in the first voltage below a first predefinable threshold is detected at a power supply input of the brake and/or a drop in the second voltage below a second predefinable or predefined threshold is detected or existent at a power supply input of the second electronic control.

17. The conveying device as claimed in claim 1, further comprising:

a switching element is provided in a circuit leading to the brake, wherein the second electronic control is designed to open the switching element if a drop of a first voltage below a first predefinable threshold is detected at a power supply input of the brake and/or a drop of a second voltage below a second predefinable or predefined threshold is detected or existent at a power supply input of the second electronic control.

18. The conveying device as claimed in claim 2, wherein the drive motor is separated electrically from the brake inside the conveying roller.

19. The conveying device as claimed in claim 2, wherein a first cabling assigned to the drive motor is guided out of the conveying roller solely on the side of the conveying roller closer to the first frame profile and a second cabling assigned to the brake is guided out of the conveying roller solely on the side of the conveying roller closer to the second frame profile.

20. An operating method for a conveying device, the conveying device comprising:

a first frame profile, a second frame profile spaced apart from the first frame profile, a conveying roller comprising a drive motor and a brake, the conveying roller being arranged between the first and second frame profiles, a first electronic control assigned to the drive motor, and a second electronic control assigned to the brake, wherein the method comprises:

providing a command to start up the conveying roller, applying, on the basis of said command, electric voltage to the drive motor, and fully releasing or raising the brake only after a time delay.

21. The operating method as claimed in claim 20, wherein the drive motor and the brake are operated by a first voltage, wherein the first electronic control and/or the second electronic control is/are operated by a second, lower voltage, and wherein a circuit carrying the first voltage and including the brake is switched off when a drop of the first voltage below a first predefinable threshold is detected and/or a drop of the second voltage below a second predefined or predefinable threshold is detected or existent.

22. The operating method as claimed in claim 20, wherein a motor torque output by the drive motor is increased successively and a braking torque applied by the brake is lowered successively.

23. The operating method as claimed in claim 20, wherein a rotation of the conveying roller is monitored during the start-up process, and wherein a time gradient of a braking torque of the brake is lowered with rotations which are in the same direction as a motor torque output by the drive motor and is increased with rotations which are in opposite direction to the motor torque output by the drive motor.

24. The operating method as claimed in claim 20, wherein the brake is released/raised by a step-like control signal in one step.

25. The operating method as claimed in claim 24, wherein the brake is released/raised by a step-like control signal in one step, when a motor torque output by the drive motor has a predefinable value.

26. The operating method as claimed in claim 25, wherein the motor torque output by the drive motor is increased by a step-like control signal in one step to the said predefinable value.

* * * * *